June 24, 1969    I. L. FEDOTOV ET AL    3,452,202
METHOD FOR DETERMINING THE SURFACE DENSITY AND THICKNESS
OF SHEET MATERIALS AND FILMS
Filed June 16, 1965 ated June 24, 1969

3,452,202
METHOD FOR DETERMINING THE SURFACE DENSITY AND THICKNESS OF SHEET MATERIALS AND FILMS
Igor Leonidovich Fedotov, ulitsa Moskovskaya 254, korpus 6, kv. 16; Vladimir Alexandrovich Yanushkovsky, ulitsa Exporta 2a, kv. 46; Iegoshua Mikhailovich Taxar, ulitsa Moskovskaya 254, korpus 6, kv. 4; and Boris Akibovich Olshvanger, ulitsa Kristapa 22, kv. 21, all of Riga, U.S.S.R.
Filed June 16, 1965, Ser. No. 464,300
Int. Cl. G01t *1/16, 1/18;* H01j *39/00*
U.S. Cl. 250—83.3          1 Claim

ABSTRACT OF THE DISCLOSURE

A method in which a sheet of material is exposed to β-rays which pass through the material and are back-scattered by the ambient gaseous medium behind the material to undergo return passage through the material and be measured in a detector for giving information related to the value of the surface density or thickness of the material.

---

The present invention relates to radioactive methods for determining the surface density of materials.

In general, the invention relates to methods employing radiation sources for continuous control of low surface density or thickness of sheet materials and films (conductors or dielectrics) and to the devices for carrying out said methods.

There are known methods for the radioactive determining of the surface density or thickness of sheet materials, said methods consisting in recording the change in the intensity of radiation passed through the material being measured, for which purpose a radioactive source and a detector (pickup cell) of the measuring device are positioned in line on the opposite sides of the material being tested.

Such an arrangement of the measuring device units however, complicates the design and the operation thereof as it is very difficult to ensure accurate conjoint shifting of the radioactive source and detector along the width of the material being measured. It is also difficult to effect proper setting of the material being measured between the radioactive source and radiation detector, as well as to provide for reliable protection of the service personnel against radioactive irradiation.

Moreover, the accuracy of measurement of said devices sharply drops with a decrease of thickness of the material being checked.

Radioactive methods have been proposed for determination of surface density by recording the intensity of the radioactive radiation reflected from the surface being controlled, for which purpose the radioactive source and the detector are positioned in the measuring devices at a certain angle to the surface being controlled on one side thereof.

Said devices are of low measurement accuracy as the results of measurements are considerably affected by the surface finish of the material being controlled. A certain clearance between the measuring device and the surface of the mterial being controlled necessitates the provision of a special protection of the personnel against radioactive irradiation.

An object of the present invention is to provide a method for determining the surface density or thickness of sheet materials and films ensuring high accuracy of measurements, especially at low surface densities or thicknesses of materials.

The primary object of the present invention is to develop a radioactive method for determining the surface density or thickness, according to which the measuring device may be positioned on one side of the material under control, being at the same time highly sensitive and reliable as regards protection of the personnel against radioactive irradiation.

According to the present invention surface density or thickness is determined by exposure of the material being controlled to β-radiation penetrating through the material and by subsequently measuring the intensity of β-radiation back scattered from the ambient medium behind the material after its repeated passage through the material being controlled. The measured intensity allows the surface density or thickness of a material to be determined.

To realize the above method the source of β-radiation and the detector of the measuring device are mounted parallel to one another on one side of the plane passing through the end face of the β-radiation source approaching the surface of the material being controlled during measurements.

The invention will further be described in connection with the accompanying drawings, wherein.

Figure 1:
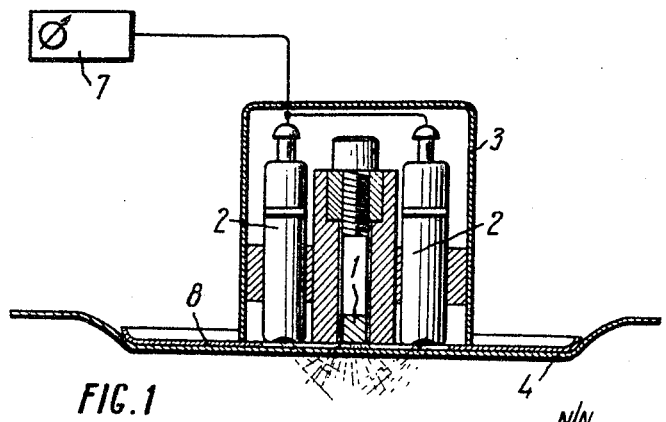
FIG. 1 shows one of the embodiments of the device according to the present invention.
Figure 3:
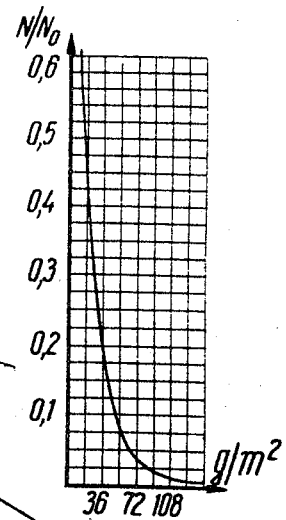

and the radiation of this isotope scattered by the air, upon the surface density of the material being controlled; and FIG. 3 graphically shows a curve of the operating characteristics of the device for determining the surface density and the thickness of sheet materials and films.

β-radiation source 1 (FIG. 1) and detector 2 mounted around said source 1 are arranged in common case 3 in the direct vicinity of material 4 being controlled and extend perpendicular to its surface. The number of detectors 2 is selected according to specific conditions of measurement.

Usable as a radioactive source of β-radiation may be the isotope of a soft β-radiation, e.g. promethium $$P_m^{147}$$

and as detectors 2, end-window halogen or scintillation counters. The use of the soft β-radiation source makes it possible to considerably reduce the weight and the overall dimensions of the device and for reliable protection of the personnel against the radioactive radiation it is sufficient to employ comparatively simple and light attachments.

For common shifting of β-radioactive source 1 and detectors 2 along the width of the material 4 being controlled, case 3 of the device in the process of measurement is connected to a reversible drive gear (not shown in the drawing).

Figure 2:
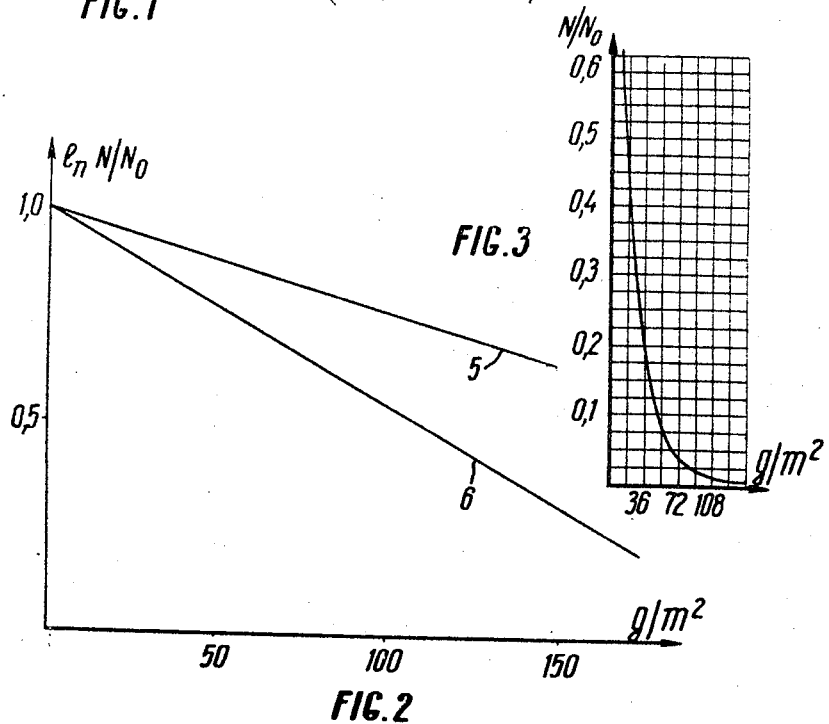
FIG. 2 shows straight lines diagrammatically representing the dependence of the direct β-radiation $$P_m^{147}$$

The radioactive radiation transmitted through the material being controlled is back-scattered by the ambient medium behind the material. At greater angles mainly low-power electrons are scattered and the greater part of them is returned to the plane of emission which results in softening of the energy spectrum of the reflected particles as shown in FIG. 2, wherein on the X-axis there are plotted the values of the surface density of the material being controlled in grams per square meter (g./m.²), and on the Y-axis—the Napierian logarithm of the ratio of the particle counting rate after their passing the material (N) to the counting rate prior to the passing (N₀). Straight line 5 is a plot of the direct radiation of isotope $$P_m^{147}$$

Straight line 6 is a plot of passage of isotope $$P_m^{147}$$

radiation reflected by the air. As seen from the plots, the radiation energy decreases almost twice. Due to the softening of the radiation energy spectrum, the sensitivity to the low surface densities becomes considerably greater than in case of using the direct penetration only.

The softened back-scattered radiation repeatedly passes through material 4 (FIG. 1), and is partially absorbed thereby and received by detector 2. The intensity of the softened back-scattered radiation is recorded by an auxiliary device 7 which may be any suitable recording or indicating device. The surface density or the thickness of the material being controlled is determined by the intensity of radiation.

As seen from the diagram (FIG. 3), wherein the operating characteristics of the device for determining the surface density or the thickness of the material being controlled are shown and wherein on the X-axis the surface density of the material being controlled in grams per square meter (g./m.²) and on the Y-axis the ratio of particle counting rate after passing through the material (N) to the counting rate without it ($N_0$) are plotted, in the range of values of the surface density from 5 to 80 g./m.² the sensitivity of the device increases with a decreasing of the surface density of the material being measured, due to which an especially high accuracy of measurements can be obtained when measuring thin materials.

To improve the sensitivity and the accuracy of said measuring device, there should be attained a direct contact of the face shield 8 (FIG. 1) made, for instance, of polished stainless steel, with material 4.

Such contact may be attained by proper arrangement of device case 3 relative to material 4 as a result of which the strip of material 4 positively envelops face shield 8 and is pressed thereto along the external surface.

Pressing of the material 4 against the shield of the measuring head can also be attained by means of local vacuum pumps and by other suitable means.

What is claimed is:

1. A method for determining the surface density of sheet material which is a measure of the thickness of the material, said methods comprising exposing sheet material to β-rays passing through said material, measuring in a detector the intensity of the β-radiation back-scattered by the ambient gaseous medium behind said material after repeated passing of said rays through the material and determining the surface density of the material being measured from the value of the radiation intensity thus measured, the radiation scattered by the material proper being isolated from the detector and therefore not measured thereby.

References Cited

UNITED STATES PATENTS 2,855,518   10/1958   Foley et al.
2,939,012   5/1960   Scherbatskoy.
3,143,886   8/1964   Lippke.

ARCHIE R. BORCHELT, *Primary Examiner.*

U.S. Cl. X.R.

250—83.6